United States Patent
Garg et al.

(10) Patent No.: US 11,204,913 B2
(45) Date of Patent: Dec. 21, 2021

(54) GENERIC DATA STATE TRANSFER INTERFACE TO THE STATE OF DATA AND INFORMATION FOR A REPORTING SYSTEM

(71) Applicant: SAP SE, Walldorf (DE)

(72) Inventors: Neha Garg, Bangalore (IN); Hemanth Kumar M S, Mysore (IN)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 16/410,092

(22) Filed: May 13, 2019

(65) Prior Publication Data

US 2020/0364210 A1 Nov. 19, 2020

(51) Int. Cl.
*G06F 7/00* (2006.01)
*G06F 17/00* (2019.01)
*G06F 16/23* (2019.01)

(52) U.S. Cl.
CPC ...... *G06F 16/2379* (2019.01); *G06F 16/2358* (2019.01); *G06F 16/2365* (2019.01)

(58) Field of Classification Search
None
See application file for complete search history.

(56) References Cited

U.S. PATENT DOCUMENTS

| | | |
|---|---|---|
| 7,945,531 B2 | 5/2011 | Mullender et al. |
| 8,788,666 B2 | 7/2014 | Adithe Venkata Ram et al. |
| 8,918,439 B2 | 12/2014 | Alatorre et al. |
| 2012/0254445 A1* | 10/2012 | Kawamoto ........... G06F 9/5088 709/226 |
| 2013/0024639 A1* | 1/2013 | Yamamoto ........... G06F 3/0635 711/165 |
| 2014/0095449 A1 | 4/2014 | Marwah et al. |
| 2015/0074037 A1* | 3/2015 | Sarferaz ................ G06F 16/252 707/602 |
| 2015/0254321 A1* | 9/2015 | Rangadass ............. G06F 16/21 707/607 |
| 2018/0349424 A1 | 2/2018 | Guarjada et al. |
| 2018/0322433 A1 | 11/2018 | Heusden et al. |

OTHER PUBLICATIONS

U.S. Appl. No. 15/949,600, Garg et al., "Consolidated Identity Management System Provisioning to Manage Access Across Landscapes", filed Apr. 10, 2018, 33 pages.

* cited by examiner

*Primary Examiner* — Tuan A Pham
(74) *Attorney, Agent, or Firm* — Fish & Richardson P.C.

(57) ABSTRACT

Methods and systems are used for providing a generic data state transfer interface to the state of data and information for a reporting system. As an example, a generic data status request is received, by a generic data source access function of a backend source system, from a reporting system. In response to the generic data status request being received, a first set of notifications is retrieved, by the generic data source access function, from a first source database. Each notification of the first set of notifications to each corresponding target notification of a set of target notifications in a generic data status response is mapped, by the generic data source access function, using a customizable mapping function based on a specific application of a plurality of applications in each notification. The generic data status response is transmitted, by the generic data source access function, to the reporting system.

17 Claims, 3 Drawing Sheets

GENERIC DATA STATE TRANSFER INTERFACE TO THE STATE OF DATA AND INFORMATION FOR A REPORTING SYSTEM

BACKGROUND

An enterprise may utilize data management source systems to address management of enterprise data and information, and a reporting system to transform and consolidate the enterprise data and information from any of the data management source systems. Enterprise data and information may include enterprise reference data and operational data that may be stored at one or more source databases managed by the data management source systems. Enterprise reference data may describe the structure and characteristics of the enterprise, is not transactional in nature, and its value tends to remain stable or declines over a very long period of time. Operational data is transactional data required by planning, manufacturing, purchasing, sales, accounting, monitoring, or other enterprise applications associated with the enterprise and its value tends to decline over time until it has no further value.

SUMMARY

The present disclosure describes a generic data state transfer interface to the state of data and information for a reporting system.

In an implementation, a computer-implemented method is used for providing a generic data state transfer interface to the state of data and information for a reporting system. A generic data status request is received, by a generic data source access function of a backend source system, from a reporting system. In response to the generic data status request being received, a first set of notifications is retrieved, by the generic data source access function, from a first source database. Each notification of the first set of notifications to each corresponding target notification of a set of target notifications in a generic data status response is mapped, by the generic data source access function, using a customizable mapping function based on a specific application of a plurality of applications in each notification. The generic data status response is transmitted, by the generic data source access function, to the reporting system.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, using a single data source and staging area may reduce the need to monitor and collect status changes from data sources compared to multiple data sources and multiple staging areas across multiple applications. Second, the customizable mapping function improves the mapping of relevant data and information to corresponding data sources in the target notifications, which may reduce the need to process multiple data sources. Third, providing activate and de-activate functionality in the customizable mapping function may also improve and increase flexibility in the mapping functionality. Fourth, providing changed status information in addition to other status information in the single staging area may also improve performance. Fifth, storing all status information in the single staging area may also reduce or eliminate inconsistencies in the status information and associated data. Sixth, the reporting system extractor and generic data source access function may also be extended to consume data and information from other possible source systems due to the extensible architecture. Seventh, providing functionality that can be utilized to modify source notifications and the customizable mapping functionality in the generic data source access function may provide the ability to process notifications with complex data representations, such as, for example, complex data types and complex mappings.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
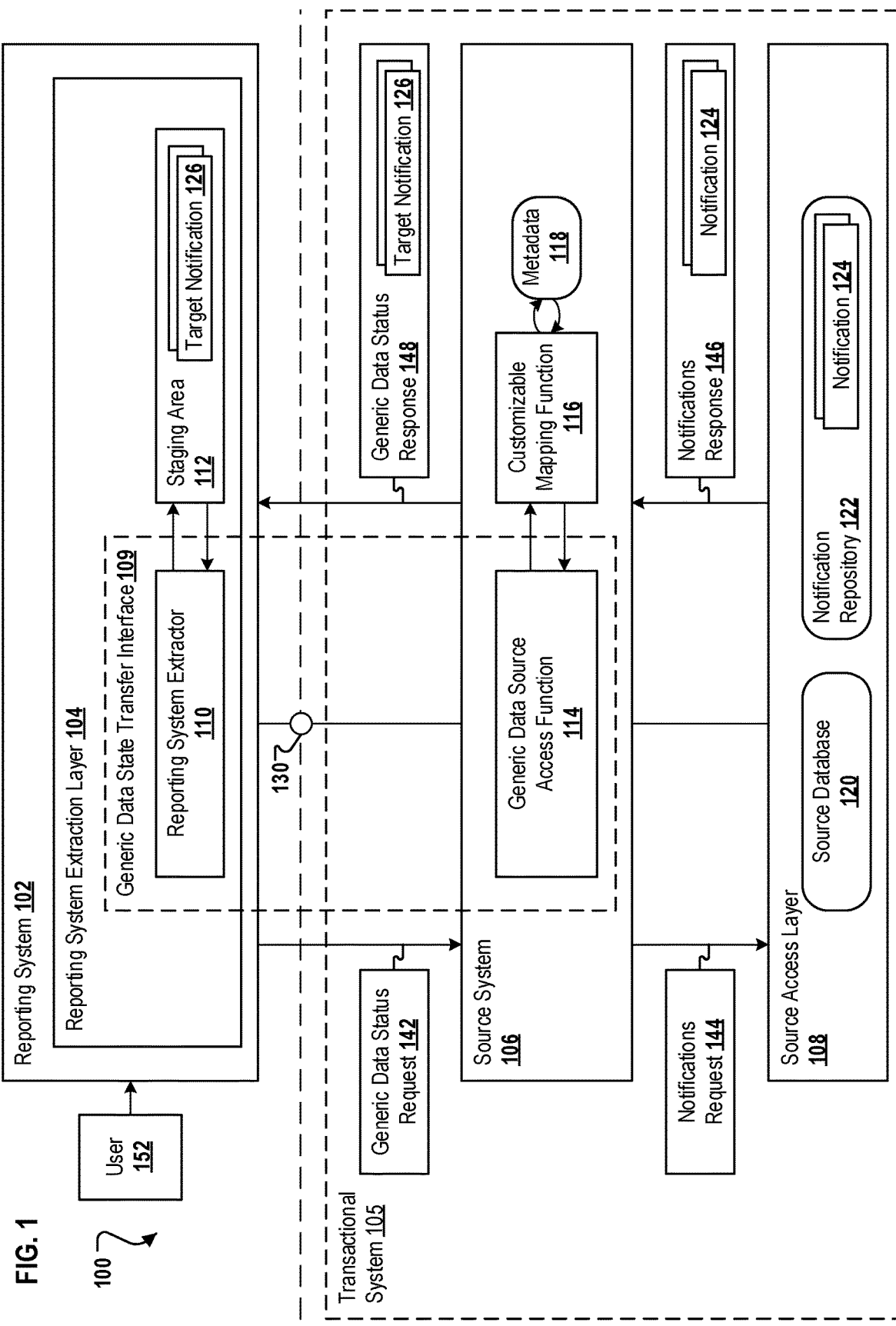
FIG. 1 is a block diagram illustrating an example distributed computing system (DCS) for providing a generic data state transfer interface to the state of data and information for a reporting system, according to an implementation of the present disclosure.

The following detailed description describes a generic data state transfer interface to a source system for a reporting system, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

As the value of enterprise data and information declines over time, an enterprise may archive, move, or delete portions of enterprise data and information managed by one or more data management source systems, which can result in a change of status of the enterprise data and information from available to archived, moved, or deleted. Any stakeholder of the enterprise data and information needs to be informed about the status and/or changes in status of the enterprise data and information in the data management source systems where the enterprise data and information is available. However, current data management source systems and reporting systems do not have the capability or mechanism to communicate this status information between them. This lack of functionality may result in the inability of a reporting system to properly process and handle usage of the status and/or changes in status of the enterprise data and information at different reporting levels.

For the purposes of this disclosure, enterprise data and information may be available in multiple staging areas of the reporting system. Each of the multiple staging areas may be specific to respective data sources managed by the data management source system, which store the detailed information of a specific application area or specific application. Incorporating status changes relevant to the data and information lifecycle into the existing data sources of the data management source system and the multiple staging areas may be difficult or not even possible. Processing the data and information from the multiple staging areas to different level of reporting in the reporting system may have different retrieval processes for the data sources based on corresponding applications. All of the statuses and status changes of the data and information may not be represented in the existing data sources due to technical and application limitations. Handling complex data and information records to be performed manually may require substantial effort and may be error prone. Multiple data sources for which a single data and information record is relevant may also add additional complexity to the systems. In addition, usage of the multiple data sources for data and information retrieval may lead to increased processing time as the multiple data source have to be monitored for status changes.

In contrast to a typical data management source system and a typical reporting system, a generic data state transfer interface to a source system for a reporting system is disclosed herein. An example reporting system may include a reporting system extractor and a staging area. The reporting system extractor is a reporting-side generic data state transfer interface that may be installed on the reporting system. An example source system may include or be associated with a generic data source access function, as well as a source access layer having a source database and a notification repository. The generic data source access function is a source-side generic data state transfer interface that may be installed the source system, or otherwise made available to the source system. The reporting system extractor operates with the generic data source access function to provide access to data and information stored at the source database and the notification repository.

In response to the status of data and information changing, the source access layer may generate a notification in the notifications repository. The source access layer may further include an interface which allows other systems to perform a retrieval of relevant information, data, and notifications from the source database and notifications repository based on a customizable selection criteria. The generic data source access function may utilize a customizable mapping function to map a processing mode in a notification to a respective reporting system mode in a corresponding target notification, map specific data in the notification to relevant data sources in the corresponding target notification, and map data identifier fields in the notification to relevant data target fields in the corresponding target notification. The reporting system extractor may also move target notifications in content of a generic data status response received from the generic data source access function to the staging area based on selection criteria.

Using a single data source and staging area may reduce the need to monitor and collect status changes from data sources compared to multiple data sources and multiple staging areas across multiple applications. The customizable mapping function improves the mapping of relevant data and information to corresponding data sources in the target notifications, which may reduce the need to process multiple data sources. Providing activate and de-activate functionality in the customizable mapping function may also improve and increase flexibility in the mapping functionality. Providing changed status information in addition to other status information in the single staging area may also improve performance. Storing all status information in the single staging area may also reduce or eliminate inconsistencies in the status information and associated data. The reporting system extractor and generic data source access function may also be extended to consume data and information from other possible source systems due to the extensible architecture. Providing functionality that can be utilized to modify source notifications and the customizable mapping functionality in the generic data source access function may provide the ability to process notifications with complex data representations, such as, for example, complex data types and complex mappings.

FIG. 1 is a block diagram illustrating an example distributed computing system (DCS) 100 for providing a generic data state transfer interface to the state of data and information for a reporting system, according to an implementation of the present disclosure. At a high level, the illustrated DCS 100 includes or is made up of one or more communicably coupled computers or other components (see FIG. 3) that communicate across a network 130 (e.g., operating within a cloud-computing-based environment). The illustrated DCS 100 includes a reporting system 102, a reporting system extraction layer 104, a generic data state transfer interface 109, a reporting system extractor 110, a staging area 112, a transactional system 105, a backend source system 106, a generic data source access function 114, a customizable mapping function 116, metadata 118, a source access layer 108, a source database 120, and a notification repository 122. Although the detailed description is focused on data state functionality, other functionality is envisioned to be covered by the described subject matter. Discussion of data state transfer functionality is not intended to limit the detailed description to only data state transfer functionality and/or to limit the detailed description in any way.

The reporting system 102 may be any computing device operable to connect to and/or communicate with at least the backend source system 106 and/or the generic data source access function 114 (or components interfacing with any of these—whether or not illustrated). As illustrated, the reporting system 102 connects or interfaces to a single backend source system 106. In other instances, the reporting system 102 may connect to a plurality of systems 106, while in some instances, different source systems 106 can be connected to two or more reporting systems 102, where appropriate. In general, the reporting system 102 comprises an electronic computing device operable to receive, transmit, process, and store any appropriate data associated with the DCS 100. There may be any number of reporting systems 102 associated with, or external to, the DCS 100. In a number of embodiments, the reporting system 102 may be a component of a business warehouse system, or comprise a business warehouse system.

The transactional system 105 may be any computing device operable to connect to and/or communicate with at least the reporting system 102, and/or the reporting system extractor 110 (or components interfacing with any of these—whether or not illustrated). As illustrated, the transactional system 105 connects or interfaces to a single reporting system 102. In other instances, the transactional system 105 may connect to a plurality of reporting systems 102, while in some instances, different transactional systems 105 can be connected to two or more reporting systems 102, where appropriate. In general, the transactional system 105 comprises an electronic computing device operable to receive, transmit, process, and store any appropriate data associated with the DCS 100. There may be any number of transactional systems 105 associated with, or external to, the DCS 100. In a number of embodiments, the transactional system 105 may be a component of an enterprise resource planning system, comprise an enterprise resource planning system, a component of a business software system, or comprise a business software system.

The source database 120 may include source data objects associated with at least one of a plurality of applications. The plurality of applications may include at least one of a financial application, a production application, a sales application, or another type of application. Each source data object may comprise a transaction data entry for a corresponding application of the plurality of applications including data associated with a transaction and one of a data source, a data store, a query, or a transaction. A transaction may include one of an archive transaction, a delete transaction, an update transaction, a modify transaction, or another type of transaction provided by the source access layer 108. Source data objects may be created during operation of the transactional system 105 that accesses source database 120. Availability of a source data object in the source database 120 may be based on a status change of the source data object. For example, data in a source data object may still available in the source database 120 when the data has been changed. Data in a source data object will be unavailable when the data has been archived, deleted, moved, or destructed.

The notification repository 122 may include notifications, such as notifications 124, associated with at least one of the plurality of applications. A notification 124 is a cross-application notification which is applicable across all of the plurality of application. Each notification 124 may include at least one of a data record, a specific application of the plurality of applications associated with the data record, and a processing mode. The data record may include data identifier fields associated with the source data object and key information associated with the data identifier. The data record may also include specific data that corresponds to the specific data in a source data object, when the specific data in the source data object is available in the source database 120, which may occur when the specific data in the source data object has been changed. Otherwise, the data record will not include any specific data, when the specific data in the source data object is unavailable in the source database 120, which may occur when the specific data in the source data object has been archived, deleted, moved, or destructed. The processing mode may indicate the state of the data record after productive usage and may include one of archived, deleted, moved, destructed, changed, or another state of the data record provided by the source access layer 108. A notification 124 may be generated during archiving, deletion, moving, destructing, changing, or other state change processing of the specific data in the source data object in the source database 120. The processing mode in the notification 124 can represent the state of the data record at the time the notification 124 was generated. When a notification 124 is generated, the notification 124 is stored at notification repository 122. Another notification 124 may be generated during subsequent state change processing of the specific data in the source data object in the source database 120. For example, a first notification 124 may be generated during changing of the specific data in the source data object in the source database 120 and may include the specific data in the first notification 124. A second notification 124 may be generated during moving the specific data in the source data object in the source database 120, but will not include the specific data as it will no longer be available in the source data object after the specific data has been moved.

The reporting system extractor 110 is the reporting-side of the generic data state transfer interface 109 that may be installed on one or more reporting systems 102. The reporting system extractor 110 operates with the corresponding generic data source access function 114 to provide access to data and information stored at source database 120 and/or notification repository 122. The generic data state transfer interface 109 may comprise a trusted secure interface between the reporting system extractor 110 and the generic data source access function 114. In one or more embodiments, the generic data state transfer interface 109 may comprise an authenticated representational state transfer (REST) call from the reporting system extractor 110 to the generic data source access function 114. The reporting system extractor 110 may be application agnostic and may provide a minimal set of functionality needed to support authentication and communication with the generic data source access function 114. In particular, the minimal set of functionality provided by the reporting system extractor 110 may include, for example, user authentication at the generic data source access function 114, management of security information, such as, open authorization (OAuth) refresh and access tokens provided by an OAuth server (not illustrated in FIG. 1), exchange of generic data status request parameters and generic data status response data with the generic data source access function 114, and moving data and information in the generic data status response to the staging area 112 for further processing.

The reporting system extractor 110 may provide one or more of security information, selection criteria, and additional technical parameters in a generic data status request 142. The security information may include an OAuth access token which the generic data source access function 114 may utilize for authenticating the reporting system extractor 110. The selection criteria may include one of a complete data request or a changed data request. When the selection criteria includes the complete data request, a generic data status response 148 to the generic data status request 142 is based on any notification 124 retrieved from the notification repository 122 having a processing mode of archived, deleted, moved, or destructed. When the selection criteria includes the changed data request, the generic data status response 148 to the generic data status request 142 is based on any notification 124 retrieved from the notification repository 122 having a processing mode of changed in addition to any notification 124 retrieved from the notification repository 122 having a processing mode of archived, deleted, moved, or destructed. The reporting system extractor 110 may then send the generic data status request 142 to the generic data source access function 114.

The generic data source access function 114 is the source-side of the generic data state transfer interface 109 that may be installed on one or more backend source systems 106. The generic data source access function 114 may receive the generic data status request 142 from the reporting system extractor 110. The generic data source access function 114 may utilize the security information provided in the generic data status request 142 for authentication of the reporting system extractor 110. For example, the security information provided in the generic data status request 142 may include an OAuth access token, which the generic data source access function 114 may provide to an OAuth server (not illustrated in FIG. 1) to authenticate the reporting system extractor 110.

In response to receiving the generic data status request 142, the generic data source access function 114 may retrieve a set of notifications 124 from the notification repository 122 using a source access interface provided by the source access layer 108. The generic data source access function 114 may generate a notifications request 144 including the selection criteria provided in the generic data status request 142. The generic data source access function 114 may transmit the notifications request 144 to the source access layer 108 using the source access interface. The source access layer 108 may generate a notifications response 146 including a relevant set of notifications 124 from the notification repository 122 based on the selection criteria provided in the notifications request 144. When the selection criteria includes the complete data request, the set of notifications 124 in the notifications response 146 may include any notification 124 retrieved from the notification repository 122 having a processing mode of archived, deleted, moved, or destructed. When the selection criteria includes the changed data request, the set of notifications 124 in the notifications response 146 may include any notification 124 retrieved from the notification repository 122 having a processing mode of changed in addition to any notification 124 retrieved from the notification repository 122 having a processing mode of archived, deleted, moved, or destructed. The source access layer 108 may transmit the notifications response 146 to the generic data source access function 114.

The generic data source access function 114 may receive the notifications response 146, including the set of notifications 124 retrieved from the notifications repository 122, from the source access layer 108. The generic data source access function 114 may map each notification 124 of the set of notifications 124 to a corresponding target notification 126 of a set of target notifications 126 using the customizable mapping function 116 based on a specific application of the plurality of applications in the notification 124. A target notification 126 may include a reporting system mode, data sources corresponding to specific data in the corresponding notification 124, and data target fields corresponding to identifier fields in the corresponding notification 124. The reporting system mode may indicate the state of the data sources in a target notification 126 and may comprise one of archived, deleted, and destructed supported by the reporting system 102.

The generic data source access function 114 provides application metadata (via metadata 118) associated with each application of the plurality of applications supported by the generic data source access function 114. The application metadata 118 associated with each application may include at least one of mapping rules between processing modes provided by the source access layer 108 and reporting system modes supported by the reporting system 102, mapping rules between specific data in a notification 124 to relevant data sources in a corresponding target notification 126, and mapping rules between data identifier fields in a notification 124 to data target fields in a corresponding target notification 126, among others.

The customizable mapping function 116 may utilize application metadata 118, including the mapping rules associated with a specific application of the plurality of applications in a notification 124, to map a processing mode in the notification 124 to a respective reporting system mode in a corresponding target notification 126, map specific data in the notification 124 to relevant data sources in the corresponding target notification 126, and map data identifier fields in the notification 124 to relevant data target fields in the corresponding target notification 126, among other actions.

In one or more embodiments, the generic data source access function 114 may retrieve one or more other sets of notifications 124 from corresponding one or more other notification repositories (not illustrated in FIG. 1) based on source access metadata stored at metadata 118. The source access metadata stored at metadata 118 may include access information for each of the one or more other notification repositories to enable the generic data source access function 114 to retrieve each of the one or more other sets of notifications 124 from the corresponding one or more other notification repositories. When the one or more other sets of notifications 124 are retrieved from the one or more other notification repositories, the generic data source access function 114 may update the set of notifications 124 retrieved from the notification repository 122 to include the one or more other sets of notifications 124. The updated set of notifications 124 may be processed in the same manner as previously described including mapping each of the notifications 124 of the updated set of notifications 124 to a corresponding target notification 126 in an updated set of target notifications 126.

The generic data source access function 114 may generate a generic data status response 148 including the set of target notifications 126 mapped by the generic data source access function 114. The generic data source access function 114 may transmit the generic data status response 148 to the reporting system extractor 110.

The reporting system extractor 110 may receive or otherwise obtain the generic data status response 148, including the set of target notifications 126 generated by the generic data source access function 114, from the generic data source access function 114. The reporting system extractor 110 may move the set of target notifications 126 in the generic data status response 148 to the staging area 112 for further processing. The reporting system extractor 110 may update corresponding application data targets associated with the data target fields from the relevant data sources in each target notification 126 of the set of target notifications 126 in the staging area 112. In one or more embodiments, the reporting system 104 may further include a notification handling framework. The notification handling framework may access the set of target notifications 126 in the staging area 112 and may update corresponding application data targets associated with the data target fields from the relevant data sources in each target notification 126 of the set of target notifications 126 in the staging area 112. The updated corresponding application data targets are relevant to the reporting system 104 and may be utilized by the reporting system 104. The notification handling framework may be customizable by an end user of the reporting system 104.

Figure 2:
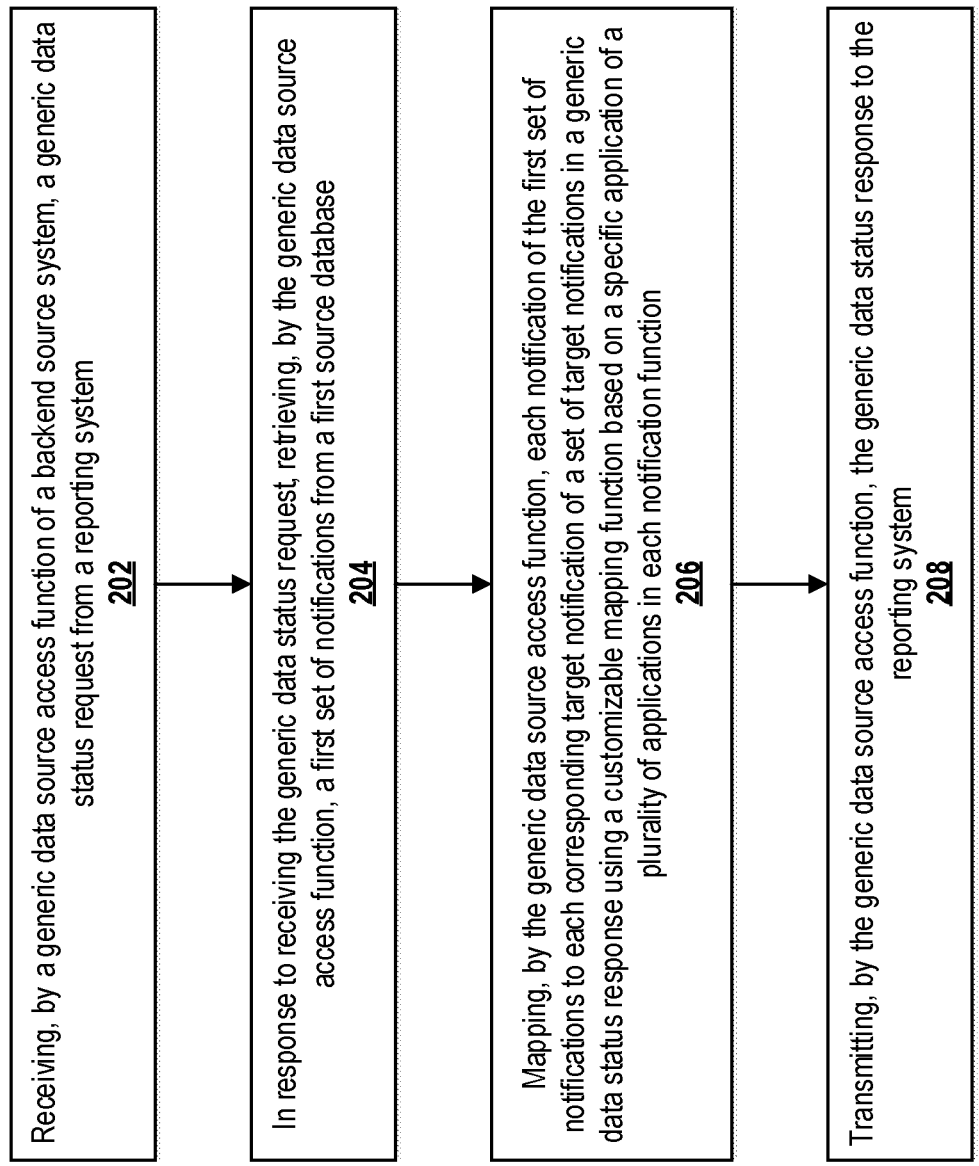
FIG. 2 is a flowchart illustrating an example of a computer-implemented method for providing a generic data state transfer interface to a source system for a reporting system, according to an implementation of the present disclosure.

FIG. 2 is a flowchart illustrating an example of a computer-implemented method 200 for providing a generic data state transfer interface to the state of data and information for a reporting system, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a generic data status request is received, by a generic data source access function of a backend source system, from a reporting system. From 202, method 200 proceeds to 204.

At 204, in response to the generic data status request being received, a first set of notifications is retrieved, by the generic data source access function, from a first source database. In some implementations, the first set of notifications is retrieved from the first source database based on a selection criteria of the generic data status request: when the selection criteria includes a changed data request, the first set of notifications retrieved from the first source database includes any notification having a processing mode of changed in addition to any notification having the processing mode of archived, deleted, moved, or destructed; and when the selection criteria includes a complete data request, the first set of notifications retrieved from the first source database includes any notification having a processing mode of archived, deleted, moved, or destructed. In some implementations, retrieval of the first set of notifications from the first source database further comprises: a second set of notifications being retrieved from a second source database; and the second set of notifications being added to the first set of notifications. From 204, method 200 proceeds to 206.

At 206, each notification of the first set of notifications to each corresponding target notification of a set of target notifications in a generic data status response is mapped, by the generic data source access function, using a customizable mapping function based on a specific application of a plurality of applications in each notification. In some implementations, the customizable mapping function utilizes application metadata associated with the specific application of the plurality of applications in the notification to: map a processing mode in the notification to a respective reporting system mode in the corresponding target notification; map specific data in the notification to relevant data sources in the corresponding target notification; and map data identifier fields in the notification to relevant data target fields in the corresponding target notification. In some implementations, the processing mode indicates status of the specific data in the notification after productive usage and comprises one of archived, deleted, moved, changed, and destructed. In some implementations, the respective reporting system mode indicates the status of the relevant data sources in the corresponding target notification and comprises one of archived, deleted, and destructed. From 206, method 200 proceeds to 208.

At 208, the generic data status response is transmitted, by the generic data source access function, to the reporting system. In some implementations, a reporting system extractor, when the generic data status response is received from the generic data source access function, updates corresponding application data targets associated with the relevant data target fields from the relevant data sources in each target notification of the set of target notifications in the generic data status response. In some implementations, the reporting system: receives the generic data status response from the generic data source access function; and moves the set of target notifications in the generic data status response to a staging area of the reporting system for further processing. After 208, method 200 stops.

Figure 3:
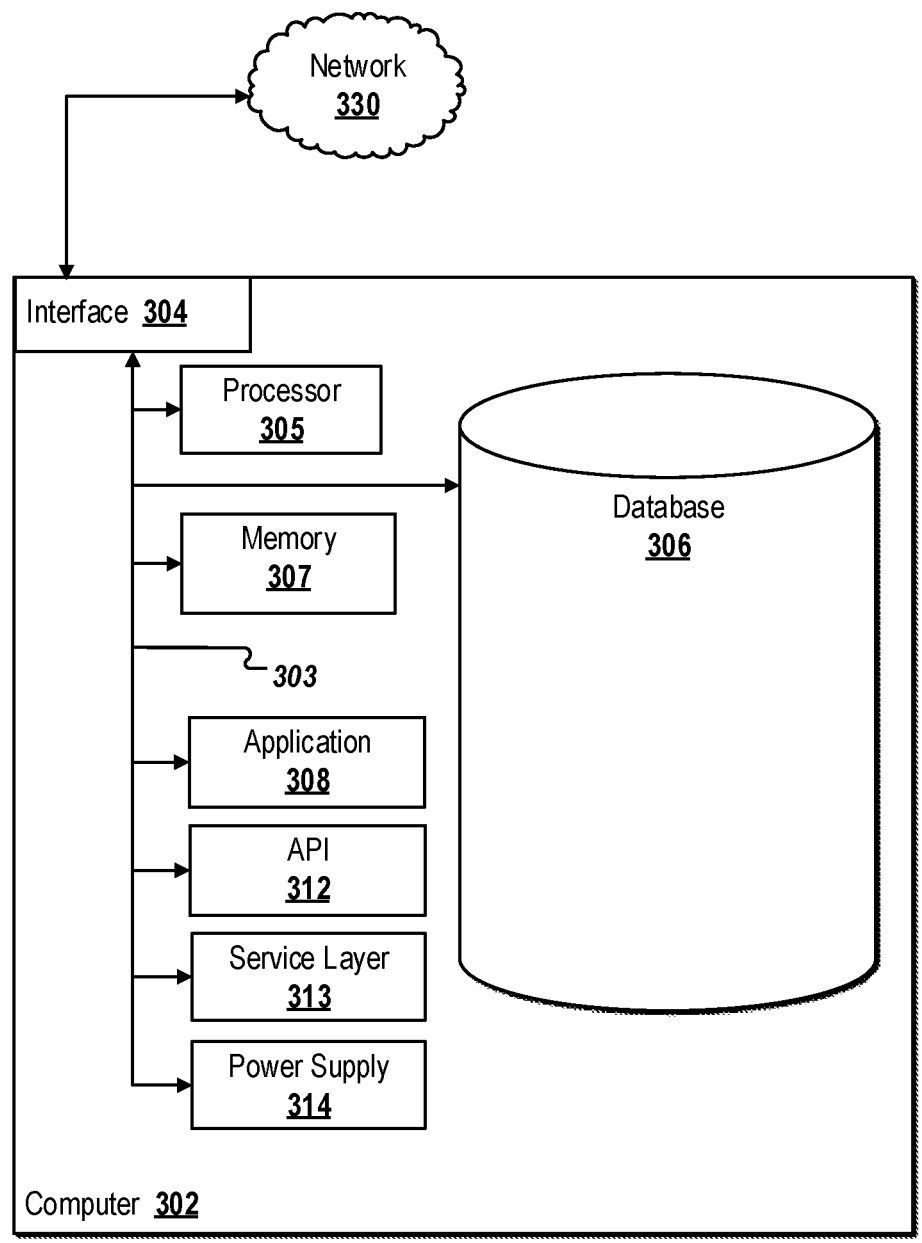
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: receiving, by a generic data source access function of a backend source system, a generic data status request from a reporting system; in response to receiving the generic data status request, retrieving, by the generic data source access function, a first set of notifications from a first source database; mapping, by the generic data source access function, each notification of the first set of notifications to each corresponding target notification of a set of target notifications in a generic data status response using a customizable mapping function based on a specific application of a plurality of applications in each notification; and transmitting, by the generic data source access function, the generic data status response to the reporting system.

The foregoing and other described implementations can each, optionally, include one or more of the following features:

A first feature, combinable with any of the following features, wherein the customizable mapping function utilizes application metadata associated with the specific application of the plurality of applications in the notification to: map a processing mode in the notification to a respective reporting system mode in the corresponding target notification; map specific data in the notification to relevant data sources in the corresponding target notification; and map data identifier fields in the notification to relevant data target fields in the corresponding target notification.

A second feature, combinable with any of the previous or following features, wherein the processing mode indicates status of the specific data in the notification after productive usage and comprises one of archived, deleted, moved, changed, and destructed, and wherein the respective reporting system mode indicates the status of the relevant data sources in the corresponding target notification and comprises one of archived, deleted, and destructed.

A third feature, combinable with any of the previous or following features, further comprising: when the generic data status response is received from the generic data source access function, updating, by a reporting system extractor, corresponding application data targets associated with the relevant data target fields from the relevant data sources in each target notification of the set of target notifications in the generic data status response.

A fourth feature, combinable with any of the previous or following features, further comprising: receiving, by the reporting system, the generic data status response from the generic data source access function; and moving, by the reporting system, the set of target notifications in the generic data status response to a staging area of the reporting system for further processing.

A fifth feature, combinable with any of the previous or following features, wherein retrieving the first set of notifications from the first source database is based on a selection criteria of the generic data status request: when the selection criteria includes a changed data request, the first set of notifications retrieved from the first source database includes any notification having a processing mode of changed in addition to any notification having the processing mode of archived, deleted, moved, or destructed; and when the selection criteria includes a complete data request, the first set of notifications retrieved from the first source database includes any notification having a processing mode of archived, deleted, moved, or destructed.

A sixth feature, combinable with any of the previous or following features, wherein retrieving the first set of notifications from the first source database further comprises: retrieving a second set of notifications from a second source database; and adding the second set of notifications to the first set of notifications.

In a second implementation, a non-transitory, computer-readable medium storing one or more instructions executable by a computer system to perform operations comprising: receiving, by a generic data source access function of a backend source system, a generic data status request from a reporting system; in response to receiving the generic data status request, retrieving, by the generic data source access function, a first set of notifications from a first source database; mapping, by the generic data source access function, each notification of the first set of notifications to each corresponding target notification of a set of target notifications in a generic data status response using a customizable mapping function based on a specific application of a plurality of applications in each notification; and transmitting, by the generic data source access function, the generic data status response to the reporting system.

The foregoing and other described implementations can each, optionally, include one or more of the following features:

A first feature, combinable with any of the following features, wherein the customizable mapping function utilizes application metadata associated with the specific application of the plurality of applications in the notification to: map a processing mode in the notification to a respective reporting system mode in the corresponding target notification; map specific data in the notification to relevant data sources in the corresponding target notification; and map data identifier fields in the notification to relevant data target fields in the corresponding target notification.

A second feature, combinable with any of the previous or following features, wherein the processing mode indicates status of the specific data in the notification after productive usage and comprises one of archived, deleted, moved, changed, and destructed, and wherein the respective reporting system mode indicates the status of the relevant data sources in the corresponding target notification and comprises one of archived, deleted, and destructed.

A third feature, combinable with any of the previous or following features, further comprising: when the generic data status response is received from the generic data source access function, updating, by a reporting system extractor, corresponding application data targets associated with the relevant data target fields from the relevant data sources in each target notification of the set of target notifications in the generic data status response.

A fourth feature, combinable with any of the previous or following features, further comprising: receiving, by the reporting system, the generic data status response from the generic data source access function; and moving, by the reporting system, the set of target notifications in the generic data status response to a staging area of the reporting system for further processing.

A fifth feature, combinable with any of the previous or following features, wherein retrieving the first set of notifications from the first source database is based on a selection criteria of the generic data status request: when the selection criteria includes a changed data request, the first set of notifications retrieved from the first source database includes any notification having a processing mode of changed in addition to any notification having the processing mode of archived, deleted, moved, or destructed; and when the selection criteria includes a complete data request, the first set of notifications retrieved from the first source database includes any notification having a processing mode of archived, deleted, moved, or destructed.

A sixth feature, combinable with any of the previous or following features, wherein retrieving the first set of notifications from the first source database further comprises: retrieving a second set of notifications from a second source database; and adding the second set of notifications to the first set of notifications.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a generic data source access function of a backend source system, a generic data source status request from a reporting system; in response to receiving the generic data status request, retrieving, by the generic data source access function, a first set of notifications from a first source database; mapping, by the generic data source access function, each notification of the first set of notifications to each corresponding target notification of a set of target notifications in a generic data status response using a customizable mapping function based on a specific application of a plurality of applications in each notification; and transmitting, by the generic data source access function, the generic data status response to the reporting system.

The foregoing and other described implementations can each, optionally, include one or more of the following features:

A first feature, combinable with any of the following features, wherein the customizable mapping function utilizes application metadata associated with the specific application of the plurality of applications in the notification to: map a processing mode in the notification to a respective reporting system mode in the corresponding target notification; map specific data in the notification to relevant data sources in the corresponding target notification; and map data identifier fields in the notification to relevant data target fields in the corresponding target notification.

A second feature, combinable with any of the previous or following features, wherein the processing mode indicates status of the specific data in the notification after productive usage and comprises one of archived, deleted, moved, changed, and destructed, and wherein the respective reporting system mode indicates the status of the relevant data sources in the corresponding target notification and comprises one of archived, deleted, and destructed.

A third feature, combinable with any of the previous or following features, further comprising: when the generic data status response is received from the generic data source access function, updating, by a reporting system extractor, corresponding application data targets associated with the relevant data target fields from the relevant data sources in each target notification of the set of target notifications in the generic data status response.

A fourth feature, combinable with any of the previous or following features, further comprising: receiving, by the reporting system, the generic data status response from the generic data source access function; and moving, by the reporting system, the set of target notifications in the generic data status response to a staging area of the reporting system for further processing.

A fifth feature, combinable with any of the previous or following features, wherein retrieving the first set of notifications from the first source database is based on a selection criteria of the generic data status request: when the selection criteria includes a changed data request, the first set of notifications retrieved from the first source database includes any notification having a processing mode of changed in addition to any notification having the processing mode of archived, deleted, moved, or destructed; and when the selection criteria includes a complete data request, the first set of notifications retrieved from the first source database includes any notification having a processing mode of archived, deleted, moved, or destructed.

A sixth feature, combinable with any of the previous or following features, wherein retrieving the first set of notifications from the first source database further comprises: retrieving a second set of notifications from a second source database; and adding the second set of notifications to the first set of notifications.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a generic data source access function of a backend source system executed by at least one hardware processor, a generic data status request from a reporting system;
   in response to receiving the generic data status request, retrieving, by the generic data source access function, a first set of notifications from a first source database, wherein each notification of the first set of notifications corresponds to a specific application of a plurality of applications;
   in response to retrieving the first set of notifications from the first source database, mapping, by the generic data source access function, each notification of the first set of notifications to each corresponding target notification of a set of target notifications in a generic data status response using a customizable mapping function based on the specific application corresponding to each notification, wherein mapping further comprises generating the generic data status response, wherein the generated generic data status response includes the set of target notifications mapped by the generic data source access function, and wherein the customizable mapping function utilizes application metadata associated with the specific application of the plurality of applications in the notification to:
      map a processing mode in the notification to a respective reporting system mode in the corresponding target notification;
      map specific data in the notification to relevant data sources in the corresponding target notification; and
      map data identifier fields in the notification to relevant data target fields in the corresponding target notification; and
   transmitting, by the generic data source access function, the generic data status response to the reporting system.

2. The computer-implemented method of claim 1, wherein the processing mode indicates status of the specific data in the notification after productive usage and comprises one of archived, deleted, moved, changed, and destructed, and wherein the respective reporting system mode indicates the status of the relevant data sources in the corresponding target notification and comprises one of archived, deleted, and destructed.

3. The computer-implemented method of claim 1, further comprising:
   when the generic data status response is received from the generic data source access function, updating, by a reporting system extractor, corresponding application data targets associated with the relevant data target fields from the relevant data sources in each target notification of the set of target notifications in the generic data status response.

4. The computer-implemented method of claim 1, further comprising:
- receiving, by the reporting system, the generic data status response from the generic data source access function; and
- moving, by the reporting system, the set of target notifications in the generic data status response to a staging area of the reporting system for further processing.

5. The computer-implemented method of claim 1, wherein retrieving the first set of notifications from the first source database is based on a selection criteria of the generic data status request:
- when the selection criteria includes a changed data request, the first set of notifications retrieved from the first source database includes any notification having a processing mode of changed in addition to any notification having the processing mode of archived, deleted, moved, or destructed; and
- when the selection criteria includes a complete data request, the first set of notifications retrieved from the first source database includes any notification having a processing mode of archived, deleted, moved, or destructed.

6. The computer-implemented method of claim 1, wherein retrieving the first set of notifications from the first source database further comprises:
- retrieving a second set of notifications from a second source database; and
- adding the second set of notifications to the first set of notifications.

7. A non-transitory, computer-readable medium storing one or more instructions executable by a computer system to perform operations comprising:
- receiving, by a generic data source access function of a backend source system, a generic data status request from a reporting system;
- in response to receiving the generic data status request, retrieving, by the generic data source access function, a first set of notifications from a first source database, wherein each notification of the first set of notifications corresponds to a specific application of a plurality of applications;
- in response to retrieving the first set of notifications from the first source database, mapping, by the generic data source access function, each notification of the first set of notifications to each corresponding target notification of a set of target notifications in a generic data status response using a customizable mapping function based on the specific application corresponding to each notification, wherein mapping further comprises generating the generic data status response, wherein the generated generic data status response includes the set of target notifications mapped by the generic data source access function, and wherein the customizable mapping function utilizes application metadata associated with the specific application of the plurality of applications in the notification to:
  - map a processing mode in the notification to a respective reporting system mode in the corresponding target notification;
  - map specific data in the notification to relevant data sources in the corresponding target notification; and
  - map data identifier fields in the notification to relevant data target fields in the corresponding target notification; and
- transmitting, by the generic data source access function, the generic data status response to the reporting system.

8. The non-transitory, computer-readable medium of claim 7, wherein the processing mode indicates status of the specific data in the notification after productive usage and comprises one of archived, deleted, moved, changed, and destructed, and wherein the respective reporting system mode indicates the status of the relevant data sources in the corresponding target notification and comprises one of archived, deleted, and destructed.

9. The non-transitory, computer-readable medium of claim 7, further comprising:
- when the generic data status response is received from the generic data source access function, updating, by a reporting system extractor, corresponding application data targets associated with the relevant data target fields from the relevant data sources in each target notification of the set of target notifications in the generic data status response.

10. The non-transitory, computer-readable medium of claim 7, further comprising:
- receiving, by the reporting system, the generic data status response from the generic data source access function; and
- moving, by the reporting system, the set of target notifications in the generic data status response to a staging area of the reporting system for further processing.

11. The non-transitory, computer-readable medium of claim 7, wherein retrieving the first set of notifications from the first source database is based on a selection criteria of the generic data status request:
- when the selection criteria includes a changed data request, the first set of notifications retrieved from the first source database includes any notification having a processing mode of changed in addition to any notification having the processing mode of archived, deleted, moved, or destructed; and
- when the selection criteria includes a complete data request, the first set of notifications retrieved from the first source database includes any notification having a processing mode of archived, deleted, moved, or destructed.

12. The non-transitory, computer-readable medium of claim 7, wherein retrieving the first set of notifications from the first source database further comprises:
- retrieving a second set of notifications from a second source database; and
- adding the second set of notifications to the first set of notifications.

13. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
  - receiving, by a generic data source access function of a backend source system, a generic data status request from a reporting system;
  - in response to receiving the generic data status request, retrieving, by the generic data source access function, a first set of notifications from a first source database, wherein each notification of the first set of notifications corresponds to a specific application of a plurality of applications;
  - in response to retrieving the first set of notifications from the first source database, mapping, by the generic data source access function, each notification of the first set of notifications to each corresponding target notification of a set of target notifications in a generic data status response using a customizable mapping function based on the specific application corresponding to each notification, wherein mapping further comprises generating the generic data status response, wherein the generated generic data status response includes the set of target notifications mapped by the generic data source access function, and wherein the customizable mapping function utilizes application metadata associated with the specific application of the plurality of applications in the notification to:
  map a processing mode in the notification to a respective reporting system mode in the corresponding target notification;
  map specific data in the notification to relevant data sources in the corresponding target notification; and
  map data identifier fields in the notification to relevant data target fields in the corresponding target notification; and
transmitting, by the generic data source access function, the generic data status response to the reporting system.

14. The computer-implemented system of claim 13, wherein the processing mode indicates status of the specific data in the notification after productive usage and comprises one of archived, deleted, moved, changed, and destructed, and wherein the respective reporting system mode indicates the status of the relevant data sources in the corresponding target notification and comprises one of archived, deleted, and destructed.

15. The computer-implemented system of claim 13, further comprising:
  when the generic data status response is received from the generic data source access function, updating, by a reporting system extractor, corresponding application data targets associated with the relevant data target fields from the relevant data sources in each target notification of the set of target notifications in the generic data status response.

16. The computer-implemented system of claim 13, further comprising:
  receiving, by the reporting system, the generic data status response from the generic data source access function; and
  moving, by the reporting system, the set of target notifications in the generic data status response to a staging area of the reporting system for further processing.

17. The computer-implemented system of claim 13, wherein retrieving the first set of notifications from the first source database is based on a selection criteria of the generic data status request:
  when the selection criteria includes a changed data request, the first set of notifications retrieved from the first source database includes any notification having a processing mode of changed in addition to any notification having the processing mode of archived, deleted, moved, or destructed; and
  when the selection criteria includes a complete data request, the first set of notifications retrieved from the first source database includes any notification having a processing mode of archived, deleted, moved, or destructed.

* * * * *